Patented Apr. 14, 1953

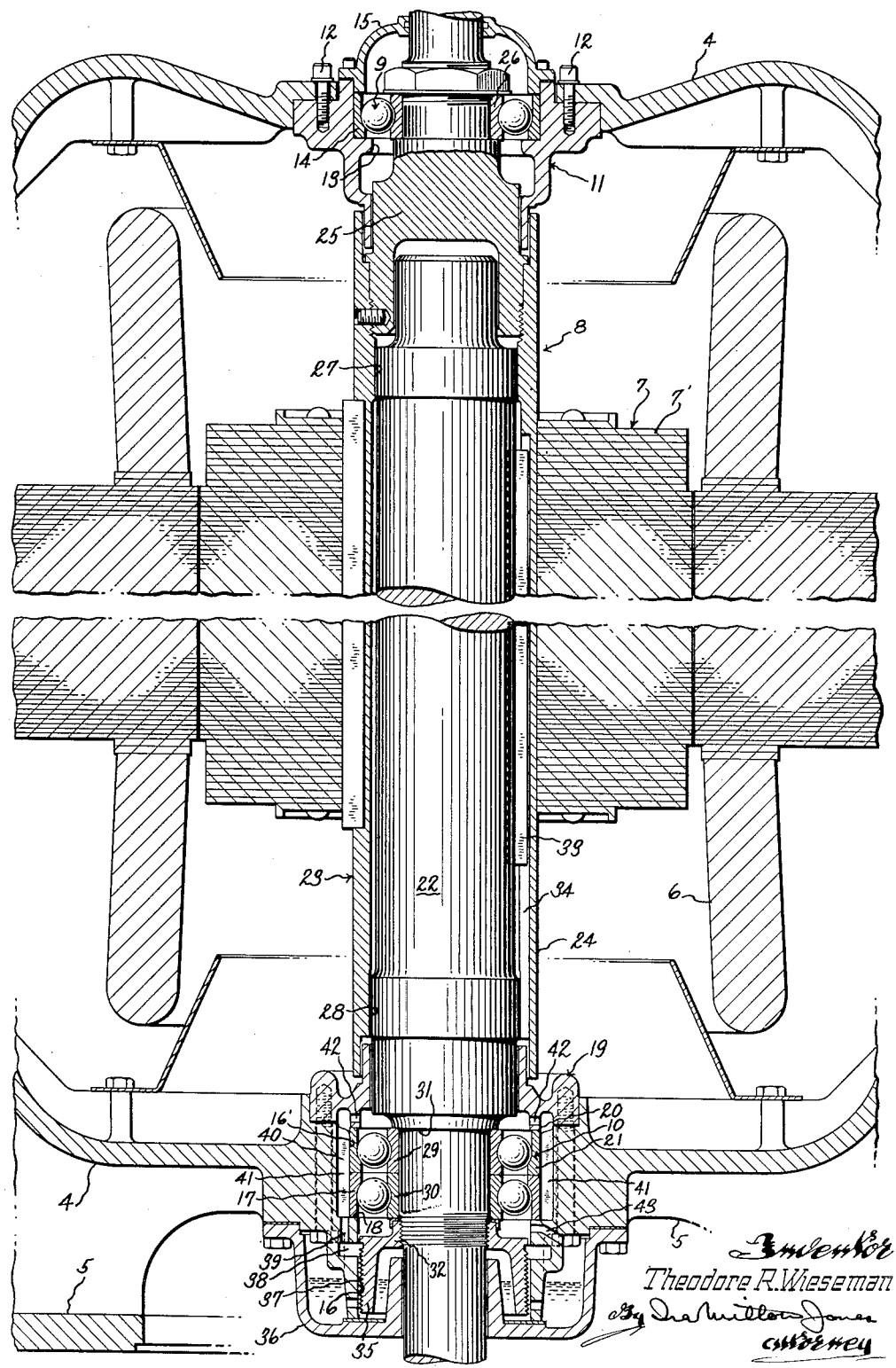

2,635,198

UNITED STATES PATENT OFFICE 2,635,198

ROTOR AND SHAFT ASSEMBLY FOR VERTICAL ELECTRIC MOTORS

Theodore R. Wieseman, Milwaukee, Wis., assignor to The Louis Allis Company, Milwaukee, Wis., a corporation of Wisconsin Application January 25, 1952, Serial No. 268,310

5 Claims. (Cl. 310—90)

This invention relates to vertical electric motors of the larger sizes, as for instance, 400 H. P., in which the weight of the rotor, i. e. the armature and the shaft upon which it is fixed is considerable; and the invention especially concerns the manner in which the rotor is mounted.

In vertical electric motors such as those used to drive certain types of pumps, the bearings in which the rotor runs must carry end thrust far in excess of that which results from the weight of the rotor alone. Usually the entire movable portion of the driven apparatus is suspended from the shaft. Obviously, this places a heavy load upon the bearings, but to make matters worse the reaction set up in the pump or other driven apparatus may at times actually reverse the direction of the thrust load so that at times the thrust may fluctuate between upward and downward.

The relative merits of ball bearings and bearings of other types for use in electric motors has been a source of never ending controversy, but despite all, experience has shown ball bearings to be ideal until a combination of high speed and heavy loads is encountered. At high speeds the load carrying capacity of ball bearings falls off appreciably. This fact has heretofore precluded the use of ball bearings in vertical motors of the kind here under consideration, many of which run at high speeds, often as high as 3600 R. P. M. Under these circumstances the capacity of the bearings is "used up" by the weight of the rotor alone. Any further thrust loads would thus exceed the capacity of the bearings.

The problem cannot be solved by the simple expedient of dividing the load between the two bearings for, as will be readily understood, it is a practical impossibility to divide end thrust equally between two bearings. One or the other inevitably carries the entire thrust load.

To overcome these problems which are inherent in conventional vertical motors of large horsepower ratings, and to enable the use of ball bearings despite their limitations, this invention has as its purpose to so arrange and construct the rotor and its mounting that one of the two bearings carries only the weight of the rotor and the other carries only the thrust loads of the driven apparatus.

More specifically it is an object of this invention to form the rotor shaft in two telescoped sections, one of which has the armature fixed thereto and the other of which is connected to the apparatus to be driven, each shaft section being mounted in one of the bearings, and the two sections being slidably splined together so that the bearings coact to mount the rotor for rotation but each individually carries only a share of the total thrust load.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which the single figure is a partial longitudinal sectional view through a vertical motor equipped with the composite rotor shaft of this invention.

Referring now to the accompanying drawing, the numeral 4 designates the end bells of a motor constructed in accordance with this invention, and which as is customary, close the upper and lower ends of the motor frame, not shown. As is also customary in vertical motors, the lower end bell is equipped with supporting feet 5 by which the motor may be firmly mounted.

Within the motor frame is the usual wound stator 6, and rotatable in it is a rotor 7 which consists of an armature 7' and a composite shaft designated generally by the numeral 8. This shaft is journaled in upper and lower bearings 9 and 10, respectively, mounted in suitable bearing seats in the end bells, the upper bearing comprising a single combination thrust and radial ball bearing and the lower comprising a pair of opposed combination thrust and radial ball bearings arranged in tandem.

The upper bearing seat may comprise, by way of illustration, a separate hub 11 secured to the upper end bell as by bolts 12, and provided with an inner radial flange 13 which forms an upwardly facing shoulder upon which the outer race 14 of the upper bearing is seated. A bearing cap 15, coaxially secured to the hub 11, engages the top face of the outer bearing race and thus cooperates with the shoulder 13, to restrain the upper bearing against axial displacement in either direction. Attention is directed to the fact that the upper ball bearing is adapted to carry only a downward thrust load.

The pair of opposed combination thrust and radial ball bearings, which together provide the lower bearing 10, are so arranged that the top one of the pair carries downward thrust, while the bottom one carries upward thrust. This arrangement enables the lower shaft bearing to carry whatever axial thrust reaction may be imposed upon the shaft by the device to which the motor is connected, whether such force be directed upwardly or downwardly.

The composite lower bearing 10 is mounted and centered in an upwardly opening longitudinally ribbed counterbore 16' in the lower end bell, with the outer race 17 of the bottom ball bearing seated upon an integral upwardly facing shoulder 18 defined by the junction of the counterbore 16' with the downwardly opening bore 16 in the end bell. An annular retainer 19, secured inside the end bell, has a downwardly directed annular ledge 20 which presses against the top of the outer race 21 of the top ball bearing and thus cooperates with the upwardly facing shoulder 18 to restrain the two ball bearings comprising the composite lower bearing against axial motion in either direction.

The composite shaft comprises essentially a pair of telescoped inner and outer sections 22 and 23, respectively. For convenience in production the outer section is formed from a tube 24 and a stub shaft 25 solidly secured together. The stub shaft 25 closes the upper end of the tube and has the inner race 26 of the bearing 9 fixed thereon, and if desired its uppermost end protrudes from the bearing cap 15 to provide a power take-off.

The inner shaft section 22 is solid and extends for the full length of the tube 24 with which it is exactly coaxial, being so held by axially spaced closely fitting bearing surfaces 27 and 28.

The lower end portion of the inner shaft section 22 is reduced in diameter to fit the inner races 29 and 30 of the composite lower bearing 10, which are clamped in place on the shaft between a shoulder 31 on the shaft and a retainer 32 threaded on the shaft. In this manner the inner shaft section is restrained against axial displacement with respect to the lower end bell in either upward or downward direction, and since the lower end bell is solidly secured to the base or other structure upon which the motor is mounted all thrust loads imposed upon the shaft 22 are carried through the bearing 10 into the supporting structure without in anywise affecting the upper bearing 9 or any other part of the motor, it being understood that the two shaft sections are entirely free to move axially with respect to one another and that the apparatus to be driven is mounted on or drivingly connected to the lower end of the shaft section 22 which projects downwardly through the bearing 10.

The armature 7 is keyed and fixed to the outer shaft section, specifically the tube 24, and torque is transmitted to the inner shaft section 22 through a slidably splined connection between the two shaft sections provided by one or more keys 33 seated in the shaft 22 and slidably received in keyways 34 in the bore of the tube 24.

The retainer 32 which, of course, rotates with the shaft has a skirt 35 depending therefrom into the bore 16 to revolve in a cup-like oil sump 36 on the bottom of the lower end bell. The outer wall surface of this skirt is closely adjacent to the wall of the bore 16 and has a helical groove 37 therein, which may be an ordinary thread, so pitched that as the shaft revolves oil is lifted from the sump into a space 38 provided by an annular groove in the bore 16 and from it through ports 39 into passages 40 between the longitudinal ribs 41 of the counterbore 16'.

The oil which rises in the passages 40 flows therefrom through ports 42 in the annular ledge 20 to the top of the bearing and after passing through the bearing is returned to the sump through passages 43 directly below the shoulder 18.

From the foregoing description taken in connection with the accompanying drawing, it will be readily apparent that by forming the rotor shaft in two telescoped sections one of which carries the armature and the other of which has the external load connected thereto, and by mounting each of these two shaft sections in one of the motor bearings so that the total thrust load is divided between the two bearings, this invention makes it possible to use ball bearings to mount the rotors of large high speed vertical motors. It will also be apparent that because of the compactness of this arrangement no change in the overall dimensions of the motor is needed.

What I claim as my invention is:

1. In a vertical electric motor having upper and lower end bells: coaxial upper and lower combination thrust and radial anti-friction bearings mounted in the end bells, each bearing having an inner and an outer race; means securing the outer races of the bearings against axial displacement in their respective end bells; a rotor shaft journaled in the bearings and comprising inner and outer telescoped sections having slidably engaged bearing surfaces by which the sections are held in coaxiality, each of said shaft sections having the inner race of one of said bearings fixed thereto so that the bearings cooperate to support the shaft for rotation; an armature fixed upon the outer shaft section; an extension on one end of the inner shaft section protruding from the adjacent bearing to be connected to the load to be driven; and means providing a sliding splined torque transmitting connection between the two shaft sections so that torque may be transmitted from one to the other while end thrust on one shaft section is limited thereto and is not transmittable to the other section, so that each bearing carries only the axial thrust of the shaft section mounted therein.

2. In a vertical electric motor, the structure set forth in claim 1 further characterized by the fact that the bearing which supports the inner shaft section comprises a pair of opposed combination thrust and radial bearings arranged in tandem so as to carry both upward and downward thrust.

3. In a vertical electric motor, the structure set forth in claim 1 further characterized by the fact that the lower end bell of the motor has supporting feet by which the motor may be mounted upon a supporting base; and further characterized by the fact that the bearing which supports the inner shaft section is seated in the lower end bell so that end thrust transmitted to said bearing from the inner shaft section is carried directly into the supporting feet for the motor.

4. In a vertical electric motor, the structure set forth in claim 1 further characterized by the fact that the outer shaft section has a solid upper end portion to which the inner race of the upper bearing is fixed, is tubular for the remainder of its length, and that the inner shaft section is solid and fills substantially the entire hollow portion of the tubular outer shaft section.

5. In a vertical electric motor, the structure set forth in claim 1, wherein the outer shaft section is built up of a tube of a length closely approximating the distance between the upper and lower bearings and a stub shaft fixed in and closing one end of the tube, the stub shaft having a part thereof beyond the end of the tube and upon which the inner race of the upper bearing is fixed; and further characterized by the fact that the inner shaft section is solid and extends for substantially the entire length of the tube with one end thereof projecting beyond the open end of the tube and having the inner race of the other bearing fixed thereon; and by the fact that the slidably engaged bearing surfaces of the inner and outer shaft sections are localized near the ends of the tube.

THEODORE R. WIESEMAN.

References Cited in the file of this patent

UNITED STATES PATENTS

| Number | Name | Date |
|---|---|---|
| 1,530,724 | Hollander | Mar. 24, 1925 |